(No Model.) 2 Sheets—Sheet 1.
M. W. BOYD.
BREAD, CAKE, AND PIE PROTECTOR.
No. 419,177. Patented Jan. 14, 1890.
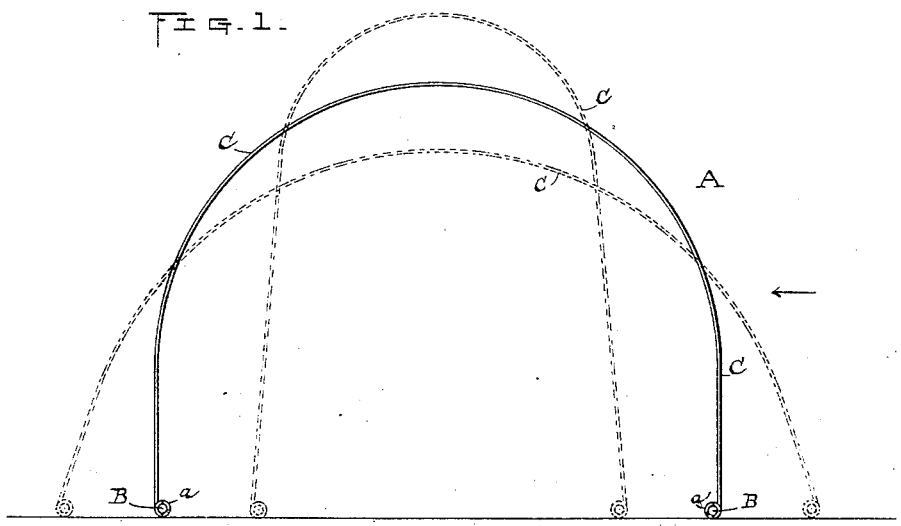
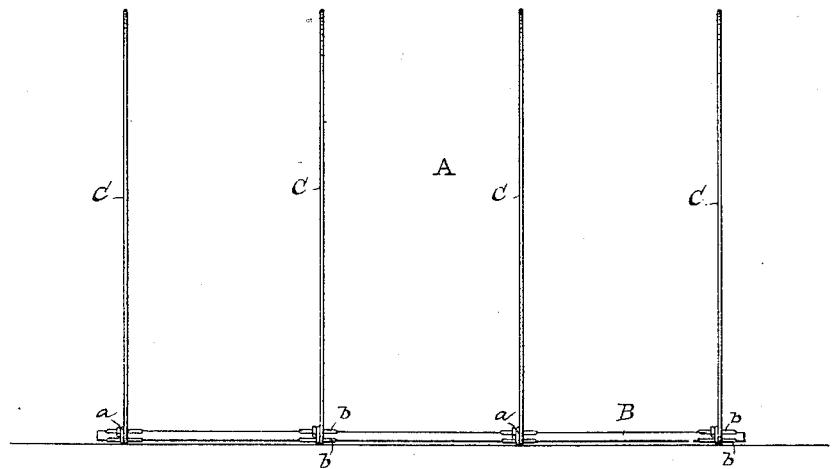

(No Model.) 2 Sheets—Sheet 2.

M. W. BOYD.
BREAD, CAKE, AND PIE PROTECTOR.

No. 419,177. Patented Jan. 14, 1890.

Witnesses:
Hattie M. Boyd
Edgar D. Dodge

Inventor:
Maria W. Boyd,
By Thos. H. Dodge, Atty.

UNITED STATES PATENT OFFICE.

MARIA W. BOYD, OF LONDONDERRY, NEW HAMPSHIRE.

BREAD, CAKE, AND PIE PROTECTOR.

SPECIFICATION forming part of Letters Patent No. 419,177, dated January 14, 1890.

Application filed August 28, 1889. Serial No. 322,224. (No model.)

*To all whom it may concern:*

Be it known that I, MARIA W. BOYD, of Londonderry, in the county of Rockingham, in the State of New Hampshire, have invented certain new and useful Improvements in Bread, Cake, and Pie Protectors; and I do hereby declare that the following is a full, clear, and exact description of the same, reference being had to the accompanying drawings and the letters of reference marked thereon, forming a part of this specification, and in which—

Figure 3:
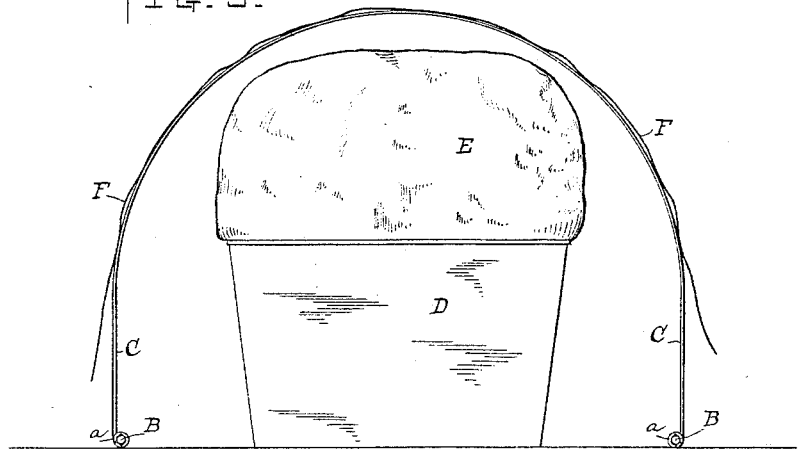

Figure 1 represents an end view of my bread, cake, and pie protector, as will be hereinafter more fully described. Fig. 2 represents a side view of the parts shown in Fig. 1, looking in the direction indicated by the arrow, Fig. 1. Fig. 3 represents an end view of the device when in use to protect a loaf of bread from burning during the baking operation, as will be hereinafter more fully described. Figs. 4, 5, 6, and 7 represent modifications in the construction of my said bread, cake, and pie protector, as will be hereinafter described.

To enable those skilled in the art to which my invention belongs to make and use the same, I will proceed to describe the same more in detail.

The present or old mode is to place pieces of paper on top of the articles of food being baked, and the objections to this mode are, that the paper resting on the article being baked is stuck thereto, while its edges are liable to come in contact with the bottom of the stove and be set on fire or burned to such an extent as to smoke the article being baked. Besides, the paper resting directly on the article to be baked prevents the heat from penetrating into the central portions, thus requiring too long a time—so much so that before the article is baked through the bottom of the article is burned.

By my present invention all the above and other objections to the old mode of baking are obviated, while the metal skeleton frame can be adjusted at pleasure to leave a greater or less space between the article being baked and the paper on top of the frame, thus enabling the cook to adjust the protector at will to obtain the desired degree of heat to bake well and evenly.

In the drawings the parts marked C are annealed copper wires, and for looks' sake are trimmed, and these wires have loops $a$ at their lower or end parts, which encircle the wires B between pressed-out projections $b\ b$ on wires B to give a more secure attachment than would be the case if wires B were of even size their whole length or round and smooth, and when the wires C (in this case four are used) are all looped about the side supporting-wires B B, I prefer to tin the loop-connections by immersion, thereby making a more finished article.

In Fig. 3 the protector is shown arranged for use in the oven, the side supporting-wires B B resting on the bottom of the oven, and on which the baking-dish D sets, the bread E being baked being protected from undue heat on its top and sides by paper F, placed on top of wires C. I unite the side wires or metal supports B B by flexible metal connections C, since by such construction the skeleton frame A can be quickly adjusted to cover a larger, broader, or higher article, as is indicated by dotted lines, Fig. 1. Then, again, by this form of construction the articles can be quickly stretched out flat for packing, hanging up, or storage; or, if preferred, they can be folded or rolled up for storage or shipment, and annealed copper wire is especially well adapted for this purpose, since it will last a life-time without breaking.

Figure 4:
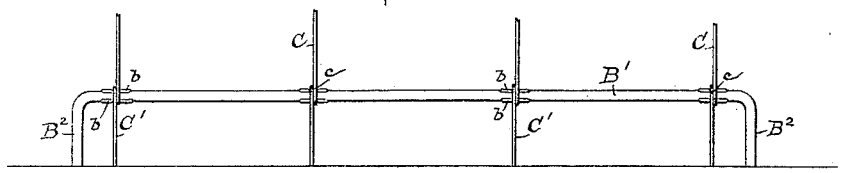
Figure 5:
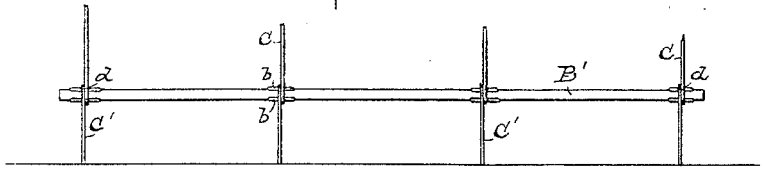
Figure 6:
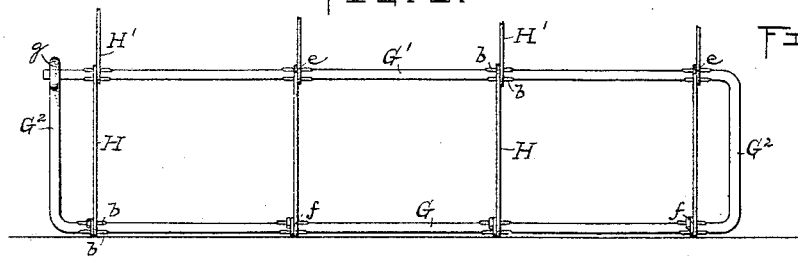
Figure 7:
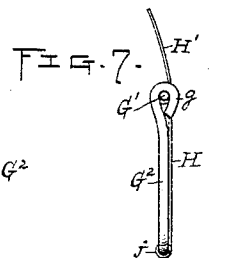

In Fig. 4 a slight modification is shown, in which the side metal supports or connections B' are a short distance above the ends of wires C, their ends C' projecting down to rest on the oven-bottom, while the ends of connections B' are also bent down for supports, as seen at $B^2$, same figure, while in Fig. 5 a still further modification is shown, the ends $B^2$ being dispensed with; and in Fig. 6 a still further modification is shown, and which may be useful in large baking establishments, where the frames are made very large, requiring side connections of considerable stiffness and strength. The metal side connection and support in this last modification is bent as shown at G G' and $G^2\ G^2$, one end being provided with loop $g$, to receive the end of G', as fully indicated in Figs. 6 and 7 of the drawings, Fig. 7 being an end view of Fig. 6, looking from the left. The flexible connections or paper-supports in this case are looped around both the parts G and G', said flexible connections being marked H between the loops e and f, and H' between loops e on one side and loops e on the other side.

In some ovens flanges are provided on the sides of the oven, and, if desired, the protector can be spread out so that its side supports or connections will rest in them for supporting the paper, and flat metal may be used in lieu of round, if preferred The advantages of my invention may be obtained by making the paper-supporting frame of foraminous and reticulated metals, although I prefer to make them from wire, as shown in the drawings, since constructions of the latter form are easily adjusted and can be packed compactly for storage and shipment.

Having described my bread, cake, and pie protector, what I claim as my invention, and desire to secure by Letters Patent, is—

1. As an improvement in devices for preventing articles of food from burning while in process of baking, a bread, cake, and pie protector consisting of side metal supports, as described, in combination with vertical, cross, and flexible connecting wire paper-supports, substantially as and for the purposes set forth.

2. The combination, with the side metal supports B, of the vertical, cross, and flexible copper-wire paper-supports C, by means of which the protector can be quickly adjusted or folded or flattened for storage or transportation, substantially as and for the purposes set forth.

MARIA W. BOYD.

Witnesses:
HATTIE M. BOYD,
ELIZA D. DODGE.